United States Patent [19]

Perchthaler et al.

[11] Patent Number: 4,812,234

[45] Date of Patent: Mar. 14, 1989

[54] OIL SLUDGE CONDITIONING EQUIPMENT

[75] Inventors: Heinz Perchthaler; Stamatios Stefou, both of Graz, Austria

[73] Assignee: Maschinenfabrik Andritz Actiengesellschaft, Graz, Austria

[21] Appl. No.: 759,124

[22] Filed: Jul. 25, 1985

Related U.S. Application Data

[63] Continuation of Ser. No. 520,014, Aug. 3, 1983, abandoned.

[30] Foreign Application Priority Data

Mar. 26, 1981 [AT] Austria .................................. 1403/81

[51] Int. Cl.⁴ ............................................ B01D 33/04
[52] U.S. Cl. .................................. 210/195.3; 210/206; 210/400
[58] Field of Search ...................... 210/400, 195.3, 206

[56] References Cited

U.S. PATENT DOCUMENTS

| | | | |
|---|---|---|---|
| 3,200,949 | 8/1965 | Aulich et al. | 210/400 X |
| 3,531,404 | 9/1970 | Goodman et al. | 210/400 X |
| 4,158,627 | 6/1979 | Ingemarsson | 210/400 X |

Primary Examiner—Tom Wyse
Attorney, Agent, or Firm—Frost & Jacobs

[57] ABSTRACT

This invention relates to an improvement in the process for conditioning oil sludges, in which a wire cloth press is used as a separation device forming a pressed cake and including a sludge basin wherein mixing of individual sludges takes place and from which a suspension is removed, and further including intermediate stages for additions assuring the dehydration procedure, the improvement comprising adding structure-improving means to the suspension to increase the shear resistance of the pressed cake and to lower the filtration impedance. The invention also relates to equipment for performing the process.

4 Claims, 1 Drawing Sheet

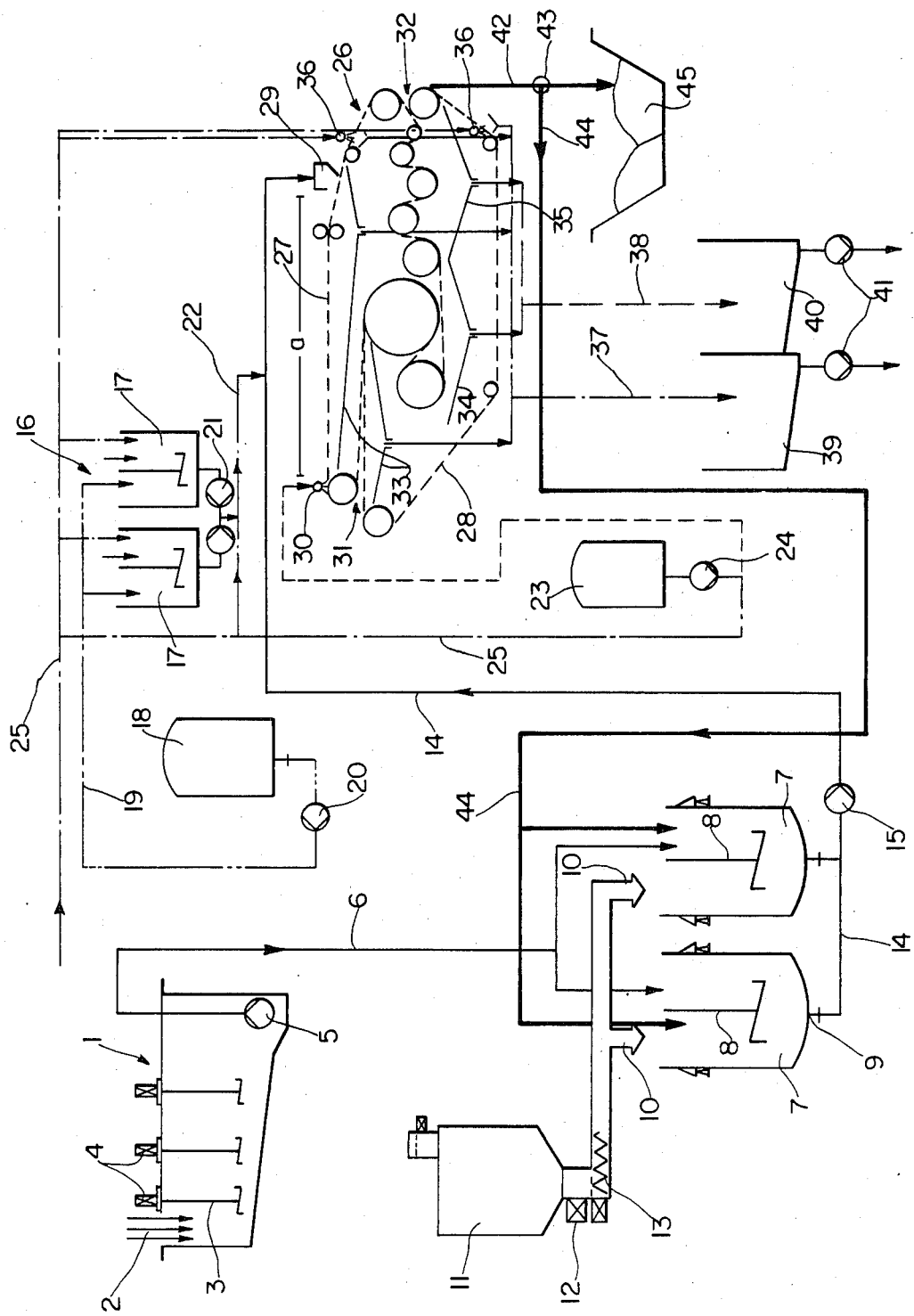

OIL SLUDGE CONDITIONING EQUIPMENT

This is a continuation of application Ser. No. 520,014, filed Aug. 3, 1983, now abandoned which is a division of application Ser. No. 358,232, filed Mar. 15, 1982, abandoned.

This invention relates to a process for conditioning oil sludges and equipment for implementing the process. The equipment is composed of a wire cloth press, as a separation means, and a sludge basin wherein mixing of the individual sludges takes place and from which a suspension can be removed, and of further intermediate stages for additions of additives to insure the dehydration procedure.

This treatment of oil sludges is used to filter water and oil from a sludge suspension and simultaneously to transfer the filtrates separately as water and oil. As dry as possible a filter cake is desired, which is suitable for a further phase of waste management.

It is known to separate an oil-water mixture by means of so-called oil separators. This is appropriate however only when such a mixture is as free of sludge as possible. For those cases where, in addition to a mixture of oil and water there are also substantial impurities in the form of solid particulates, another separation is required. Thus, it is known to deposit the sludge in clearing basins or tanks. If higher requirements are set on the dry content of the sludge, the known double wire cloth presses must be used.

All the known equipment have the drawback that they do not apply to large-scale use. The individually cascaded components such as oil separator, clearing basin, and double wire cloth press, do not as yet result in a suitable facility to separate such sludges into their individual components.

It is the object of the present invention to provide a process for conditioning oil sludges and which is applicable on a large scale, and also to provide equipment to implement the process. The equipment is composed of a wire cloth press as the separation means and a clearing basin wherein the mixing of the individual sludges takes place and from which the suspension can be removed, with further intermediate stages for additions of additives insuring the dehydration procedure. This object is attained in the present invention by:

(a) adding structure-improving means such as flue dust, to increase the shear resistance of the pressed cake and to lower the filtration impedance, (b) adding a polyelectrolyte and possibly a metal salt, and (c) possibly recycling part of the already dehydrated pressed cake into the conditioning phase.

To implement the process, equipment is used which contains agitation means in a sludge basin. The suspension is moved by means of a sludge pump into an agitation vessel with metering means, with solid filtering aids being added through a metering and conveying device. This suspension is then moved by a sludge metering pump, and in the presence of added flocculants prepared in a flocculant dissolving station, into the wire cloth press.

This process and its associated equipment make it possible to separate on a large scale a water-oil suspension mixture, the wire cloth press not only separating oil and water, but also providing a filter cake suitable for dumping or waste management. Moreover, part of the pressed cake is fed back into the conditioning phase to achieve economy of process by conserving solid aids.

The invention will be further illustrated by reference to the accompanying drawings in which the FIGURE schematically shows the design of one embodiment of equipment for oil-sludge conditioning.

As shown by the FIGURE, the equipment is composed of a sludge basin 1 which is provided at the top with an intake 2 for filling. Agitator devices 3 are positioned in the sludge basin 1 and are driven by drive means 4. A sludge pump 5 is mounted at the deepest location of the somewhat slanted bottom of the sludge basin 1. The suspension is well mixed by the agitators 3 which is then fed through the supply line 6 into the agitation vessels 7. These are provided with weight metering means. Agitators 8 are mounted within the agitation vessels 7 and are driven from the outside by means not shown. The supply lines 6 are connected to the tops of the vessels 7. Further provision is made for the supply intake 10 and feedback 44 connections. A solid silo 11 receives structure-improving means to increase the mechanical stability of the pressed cake. In such a case it is advantageous to use flue dust. The flue dust is conveyed in the proper amount by a metering device 12 into the conveyor 13 which moves it through the supply intake 10 into the agitation vessels 7. The discharge 9 connected to the supply line 14, having the pump 15 therein, is positioned in the bottom of the agitation vessels 7.

A flocculant dissolving station 16 contains an agitation vessel 17 with associated agitation means. Flocculants are moved from a supply tank 18 through a line 19 by means of a pump 20 into the flocculant dissolving station 16. A mixture of flocculants is obtained by adding water from the connected water line 25 and by the action of the agitators, and this mixture is pumped by the flocculant metering pump 21 through the flocculant supply line 22 into the feed line 14 to the material feed 29 of the wire cloth press 26.

The wire cloth press 26 is a known double wire cloth press including an upper wire cloth 27 and a lower wire cloth 28 which jointly pass through the wedging section 31 and the compressing section 32. The material is fed at the upper side of the upper wire cloth 27. The material feed 29 is provided for that purpose. Gravity dehydration takes place over a zone a, the draining water being collected by the water collecting pan 33. At the opposite end of the material feed 29, that is at the end of the zone a, provision is made for a spray means 30 thorugh which iron chloride from the iron chloride supply vessel 23 arrives by means of a metering pump 24 into the wire cloth press 26. The wedging part 31 also includes a water collecting pan 33. The suspension already passing through the upper belt and thusly being pre-dehydrated after a deflection arrives at the wedging section 31 and then in the S-shaped and deflected parts of the wire cloths 27, 28 of the compressing section. Thereafter, the wire cloths are guided to the further compression rollers, underneath which are mounted the oil catch pans 34, 35. These pans each include a pipe connector at their lowest points joining the water drain line 37 or the oil drain line 38, depending upon the filtrate, and leading into the filtrate pans 39 and 40 respectively for water and oil. The water line 25 is connected not only to the metering pump 24, but also it extends as far as the spray device 30. Moreover, the nozzles of the wire cloth cleaners 36 are connected to the water line 25, which nozzles clean both the upper wire cloth 27 and the lower wire cloth 28. The discharge again is connected to the water drain line 37. The two filtrate pans 39, 40 each are provided with a filtrate waste management pump 41 insuring the conveyance of the filtrate. The compressed cake 42 first is guided from the wire cloth press 27 through a feedback device 43 where part of the pressed cake 42 passes into the feedback line 44. However, the major part of it is fed into the dump means 45. The feedback line 44 is connected to the agitation vessels 7 where the filter cake so conveyed is used to stabilize the suspension and to conserve the flue dust.

The individual sludges are mixed in the sludge basin 1 by the agitators 3 to homogenize the suspension. Only thereby is continuous operation possible, and the addition of structure-improving agents is required to increase the mechanical stability of the pressed cake until it can be dehydrated on the wire cloth press 26. Flue dust is used for that purpose, but to conserve it, part of the filter cake is used. However, wood chips, agricultural fiber residues, low-grade cellulose or other substances also can be used. What is essential is the assurance of the mechanical stability of the cake, i.e., the shearing resistance of the pressed cake. Advantageously, a polyelectrolyte is added to improve the dehydrability of the oil sludge. Further, the addition of a polyelectrolyte together with the iron chloride results in an improvement in sludge dehydration. The addition, if any, of the metal salt does not take place directly in the sludge feed line, rather it takes place following the pre-dehydration, and best at the end of the filtering zone on the wire cloth press by being sprayed onto the generated filter cake.

To perform the process more economically, part of the already dehydrated pressed cake is fed back into processing. In this manner the addition of solids, flue dust as a rule, is substantially conserved.

Due to so controlling the filtrate on the dehydration machine that oil and water can be separately removed, economical operation is obtained. This is made possible because water drains off under slight pressure in the filtering zone, while oil requires a higher pressure for separation and accordingly collects in the pressing zone.

It will be obvious to those skilled in the art that many modifications may be made within the scope of the present invention without departing from the spirit thereof, and the invention includes all such modifications.

What we claim is:

1. Apparatus for conditioning oil sludges with a horizontally arranged double wire cloth press, in which said horizontally arranged double wire cloth press is used as a separation device forming a pressed cake, including a sludge basin and agitator means mounted within said sludge basin wherein mixing of individual sludges takes place and from which a suspension is removed, and including intermediate stages for additions assuring the dehydration procedure, sludge pump means for conveying the suspension into an agitation vessel with metering means, metering means and conveying means for adding solid filtering aid means to the suspension in said agitation vessel, a flocculation dissolving station, sludge metering pump means for moving the suspension together with added organic flocculants prepared in said flocculation dissolving station into the horizontally arranged double wire cloth press, a horizontally arranged feed zone in said wire cloth press effecting gravity pre-dehydration of said suspension, means for feeding said suspension mixed with solid filtering aid means and with added organic flocculants at the beginning of said feed zone, and means for feeding a metal salt to said suspension at the end of said feed zone following said pre-dehydration.

2. The apparatus claimed in claim 1, including means for effecting further dehydration in a wedging section of the wire cloth press.

3. The aparatus claimed in claim 1, including means for effecting oil separation in a pressing zone of the wire cloth press.

4. The apparatus claimed in claim 1, including means for recycling a part of said pressed cake into the agitation vessel.

* * * * *